United States Patent [19]

Tanaka et al.

[11] 4,302,833
[45] Nov. 24, 1981

[54] AUTOMATIC RECORD SIZE DETECTOR

[75] Inventors: Hiromichi Tanaka; Osamu Imamura; Akihiro Asada, all of Yokohama, Japan

[73] Assignee: Hitachi, Ltd., Tokyo, Japan

[21] Appl. No.: 82,219

[22] Filed: Oct. 4, 1979

[30] Foreign Application Priority Data

Oct. 4, 1978 [JP] Japan .................................. 53-121514

[51] Int. Cl.³ .............................................. G11B 3/60
[52] U.S. Cl. ..................................... 369/217; 369/239
[58] Field of Search .................. 274/9 A, 39 R, 15 R; 369/184, 188, 189, 190, 217, 267, 233, 239

[56] References Cited

U.S. PATENT DOCUMENTS 3,966,330  6/1976  Ridler et al. ..................... 274/39 R
4,134,593  1/1979  Hiramatzu ......................... 274/9 A Primary Examiner—Harry N. Haroian
Attorney, Agent, or Firm—Craig and Antonelli

[57] ABSTRACT

Three sets of light receivers are arranged on the turn table of a phonograph record player. The light radiated on the turn table is received and introduced to light receiving elements for conversion into a pulse signal. When a 30-cm record is placed on the turn table, the three sets of light receivers are all converted and fail to produce a pluse signal. When a 25-cm record is placed on the turn table, the first set of light receivers are exposed; while when a 17-cm record is placed on the turn table, the first and second sets of light receivers are exposed. The number of pulses produced from the light receiving elements is counted, thus determining the size of the record placed on the turn table.

8 Claims, 5 Drawing Figures

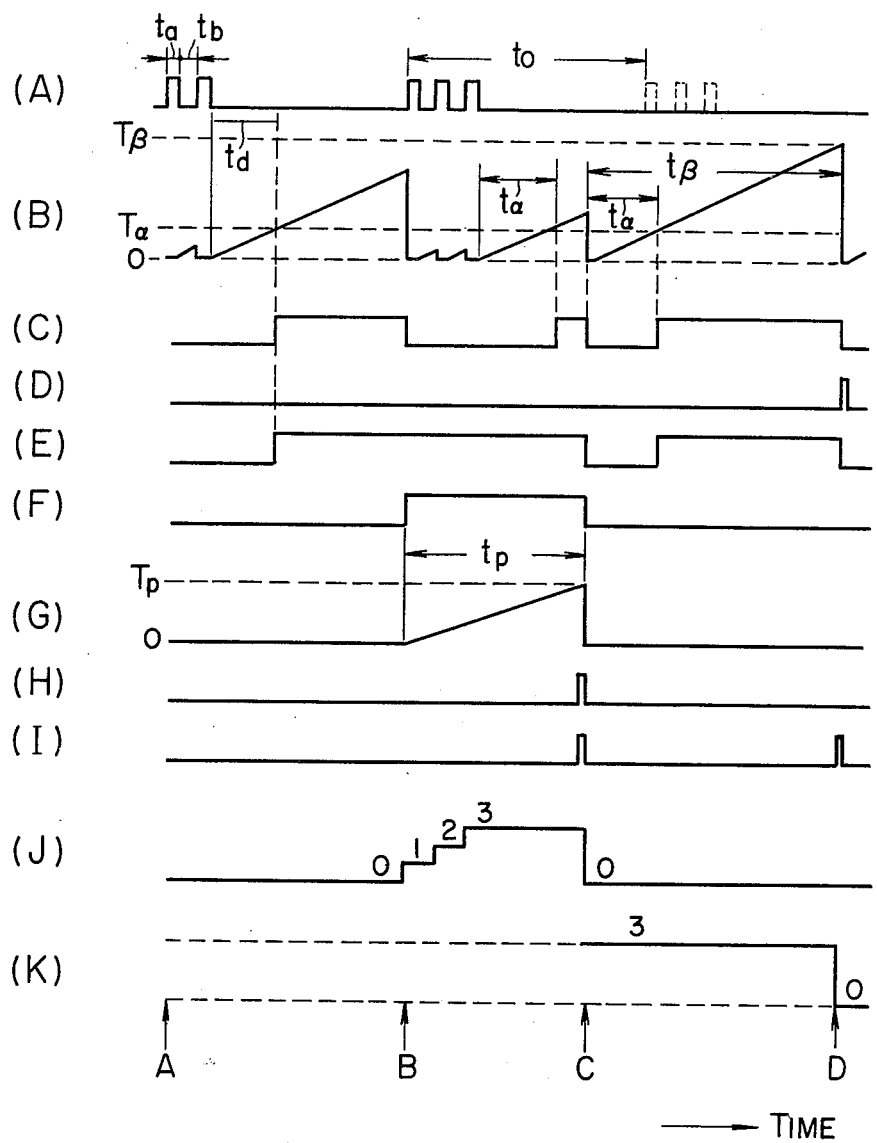

AUTOMATIC RECORD SIZE DETECTOR

BACKGROUND OF THE INVENTION

1. Field of the Invention

The present invention relates to an apparatus for automatically detecting the size of a phonograph record placed on the turn table of a phonograph record player.

2. Description of the Prior Art

The phonograph record player for reproducing information from records handles records of a variety of sizes. The records (disc-like records) generally used at present are of three types by size, including 17 cm, 25 cm and 30 cm in diameter. In the automatic player wherein the pickup arm is automatically swung and the stylus of the pickup cartridge is placed down into the groove of the disc record disposed on the turn table, it is required that the size of the record placed on the turn table be detected thereby to determine the pickup stop position to which the arm swings as it moves toward the edge of the record disc. In other words, the stylus of the pickup cartridge is required to be set down properly onto the edge of the record.

In conventional phonograph record players, the size of the disc record to be reproduced, i.e., the stop position of the pickup arm is mechanically designated, so that the pickup arm swings to the designated position where it stops and then descends onto the record. This function is accomplished by a device for designating the size of the record, which device has a lever extending therefrom for determining the swing range of the pickup arm.

In such conventional apparatuses, the record size is required to be transmitted to the disc record player each time the size of the disc record changes, thus complicating the operation of the disc record player.

SUMMARY OF THE INVENTION

Accordingly, it is an object of the present invention to provide a record size detecting apparatus for automatically detecting the size of a record placed on the turn table, thus eliminating any misjudgement of the record size.

According to the present invention, there is provided a record size automatic detecting apparatus comprising three types of light receivers arranged on the turn table, the first light receiver being arranged intermediate the hypothetical outer periphery of a 30-cm record and the hypothetical outer periphery of a 25-cm record, the second light receiver being arranged intermediate the hypothetical outer periphery of a 25-cm record and the hypothetical outer periphery of a 17-cm record, the third light receiver being arranged at a position inwardly of the hypothetical outer periphery of the 17-cm record. For reproducing a 30-cm record, all the light receivers are covered by the record; for reproducing a 25-cm record, the second and third light receivers are covered by the record; and for reproducing a 17-cm record, the third light receiver is covered by the record. Each light receiver receives light radiated in a predetermined direction from an external source, which light is introduced to a light receiving element for generating pulses. The pulses are counted to detect the size of the record placed on the turn table.

BRIEF DESCRIPTION OF THE DRAWINGS

FIG. 5 shows waveforms for explaining the operation of the embodiment of the invention.

DESCRIPTION OF THE PREFERRED EMBODIMENTS

Figure 1:
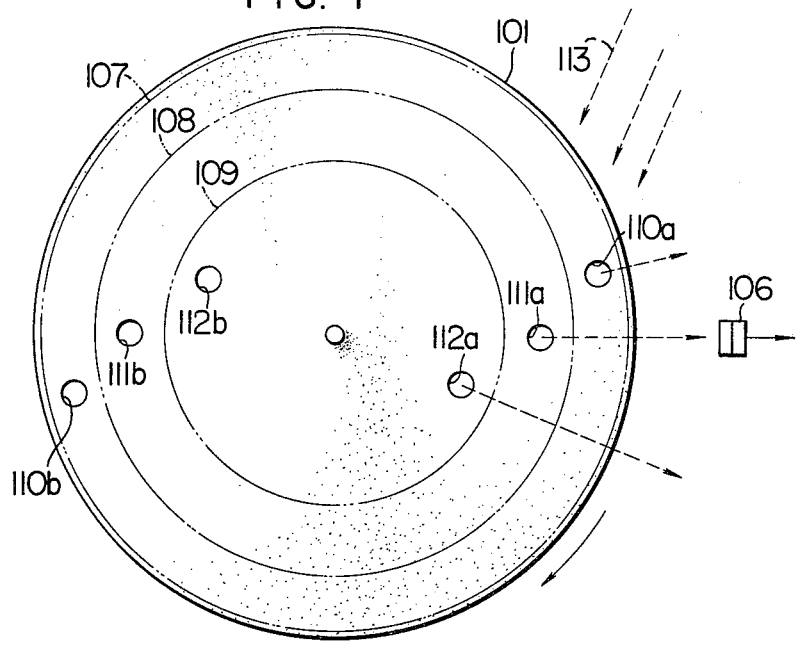
FIG. 1 is a plan view of a turn table of an automatic record size detecting apparatus according to the present invention.
Figure 2:
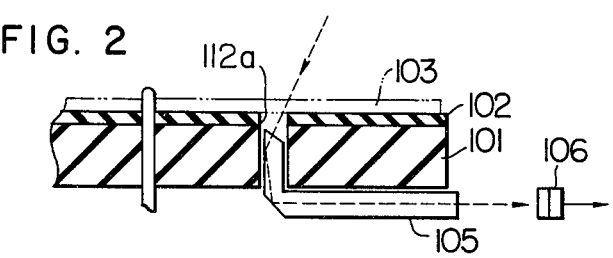
FIG. 2 is a sectional view showing part of the apparatus.

In FIGS. 1 and 2, reference numeral 101 shows a turn table, numeral 102 a rubber sheet placed on the turn table 101, and numeral 103 a disc record placed on the rubber sheet 102. Numerals 110, 111 and 112 are light receiving holes formed in the turn table 101 and the rubber sheet 102 for detecting the record size, numeral 105 a light introducing tube inserted into the light receiving hole 110, and numeral 106 a light receiving element for photo-electric conversion. There are formed six (=3×2) light receiving holes, two each for the record sizes of 30 cm, 25 cm and 17 cm. First light receiving holes 110a and 110b are formed between the circumference of the circle 107 representing the outer periphery of the 30-cm record and the circumference of the circle 108 representing the outer periphery of the 25-cm record; second light receiving holes 111a and 111b are arranged between the circumference of the circle 108 and that of the circle 109 representing the outer periphery of the 17-cm record; and third light receiving holes 112a and 112b are formed inwardly of the circle 109. The light receiving holes 110, 111 and 112 are arranged on different radii. The light receiving holes 110a and 110b are arranged on the same diameter; and so are the light receiving holes 111a and 111b, and the light receiving holes 112a and 112b, respectively on the same diameters containing the rotational center. Each of the light receiving holes 110, 111 and 112 is provided with an L-shaped light introducing tube 105 (such as of glass fiber, prism or epoxy plate) for introducing the light incident to the light receiving holes toward the outer periphery of the turn table. The light receiving holes 110, 111 and 112 are illuminated with light 113 in a predetermined direction from an external source.

In the absence of a record on the turn table, the light receiving holes 110, 111 and 112 and the light introducing tube 105 introduce the room light (which may be used in combination with some auxiliary light source to complement a weak room light) to the outer periphery of the turn table. When the optical axis of the light coincides with that of the light receiving element 106 with the rotation of the turn table, the light receiving element 106 is illuminated with the light and converts the light into an electrical signal. The light receiving element 106 is illuminated with light in a time series, so that the electrical signal outputs as shown in 201 of FIG. 3 are produced from the light receiving element 106.

Assume that a 17-cm record is placed on the turn table. The light receiving holes 112a and 112b are covered by the record, thus cutting off the light path from the room light source or an auxiliary light source to the light introducing tube 105 disposed therein. As a result, the light receiving element 106 produces an electrical output signal as shown in 202 of FIG. 3. In similar fashion, in the case where a 25-cm record is placed on the turn table, the light receiving element 106 produces an electrical output signal as shown in 203 of FIG. 3. Further, if a 30-cm record is placed on the turn table, all the light receiving holes are covered by the record so that the light receiving element 106 is not illuminated with any light and therefore an electrical output signal as shown in 204 of FIG. 3 is produced from the light receiving element 106.

It is assumed here that the light receiving element 106 is so isolated as to be illuminated with only the light that has passed the light introducing tube 105 but not any light from other light paths.

Figure 3:
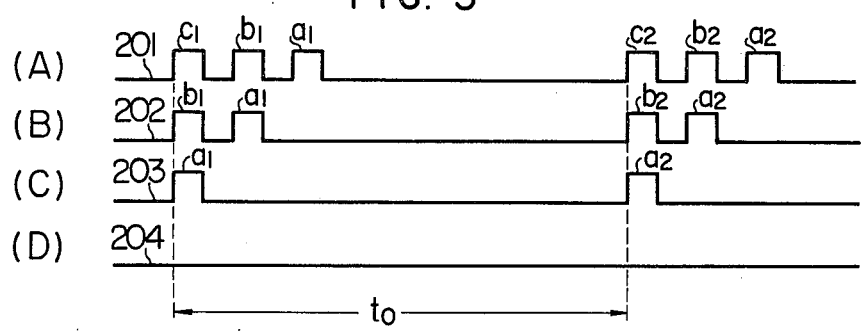
FIG. 3 shows waveforms showing patterns of the light receiving pulse signal.

If it takes $2t_o$ for the turn table to make one revolution, the light receiving element 106 produces the electrical output signal in such a timing as shown in FIG. 3. In other words, assuming that the light receiving holes 110a, 110b; 111a, 111b; and 112a, 112b are arranged exactly on the same diameters respectively and that the rotation of the turn table is not accompanied by any speed change such as wow or flutter, then the period of alternate generation of the received-light pulses a1 and a2; b1 and b2; and c1 and c2 of FIG. 3 is $t_o$. Therefore, by counting the received-light pulses (the rise or fall edges thereof) during the period $t_o$, the size of the record on the turn table is detected.

The relation between the record size and the number of the received-light pulses is shown in Table 1 below.

TABLE 1

| Record size (cm) | Number of received-light pulses | | |
|---|---|---|---|
| | n | n1 | n2 |
| 30 | 0 | 0 | 0 |
| 25 | 1 | 0 | 1 |
| 17 | 2 | 1 | 0 |
| nil | 3 | 1 | 1 |

Figure 4:
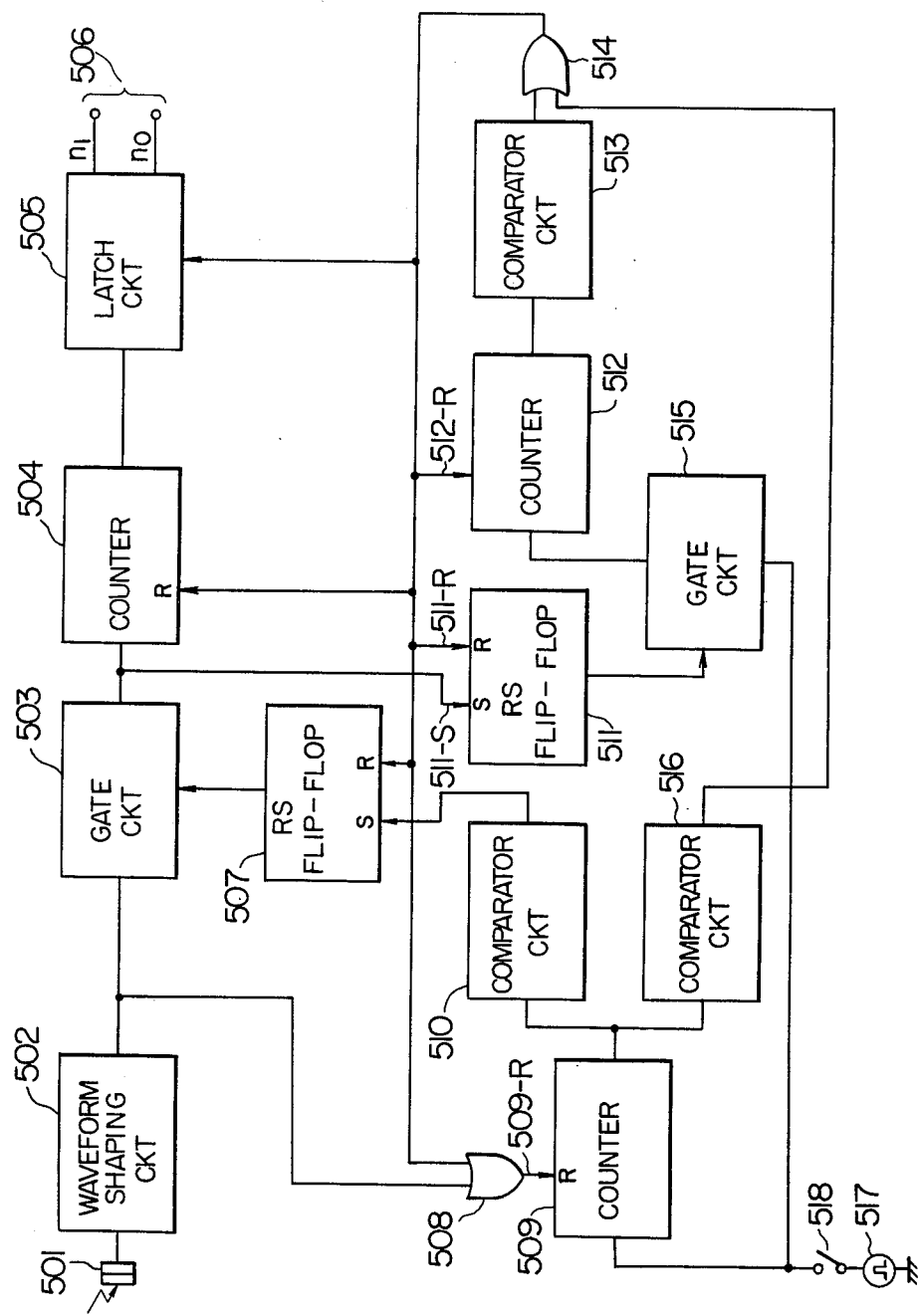
FIG. 4 is a block diagram showing an embodiment of the automatic record size detecting apparatus according to the present invention.

Next, explanation will be made of a detector circuit for determining the record size from the electrical signal of a pulse train thus obtained, with reference to FIG. 4. In FIG. 4, numeral 501 shows a light receiving element corresponding to the light receiving element 106 of FIG. 1, numeral 502 a waveform shaping circuit, numeral 503 a gate circuit for cutting off the signal path, numeral 504 a counter for counting the received-light pulses, numeral 505 a latch circuit for temporarily holding the count upon completion of counting the received-light pulses, and numeral 506 an output terminal for size detection. Numeral 509 shows a counter for measuring the off time between one received-light pulse and another received-light pulse, numeral 512 a counter for setting the counting time of the received-light pulses, numerals 510, 516 and 513 comparator circuits for comparing the counts of the counters 509 and 512 with each setting, numeral 515 a gate circuit, numerals 507 and 511 RS flip-flops with priority given to reset, and numerals 508 and 514 two-input OR circuits. Numeral 517 shows a rotational speed signal for driving the motor for the turn table, and numeral 518 a switch turned on for enabling the detection of the record size when the turn table reaches the steady rotation.

The basic operation of the circuit of FIG. 4 will be explained below. The pulse signal received by the light receiving element 501 is waveform shaped by the waveform shaping circuit 502 and is applied through the gate circuit 503 to the counter 504 where the number of the pulses is counted. The resulting count is temporarily held in the latch circuit 505 and produced as a binary parallel signal at the terminals n1 and n2 of the output 506. The control of the gate circuit 503, the latch timing of the latch circuit 505 and the resetting timing of the counter 504 will be described below.

When the turn table enters steady rotation, the switch 518 is closed thereby to start the detection of the record size. The counter 509 counts the rise or fall edges of the rotational speed signal 517 for driving the motor of the turn table, so that the resulting count is compared with the set value of the comparator circuit 510.

The reset terminal 509-R of the counter 509 is impressed with the received-light pulses through the OR gate 508. Each time of the application of the received-light pulse to the reset terminal 509-R, the counter 509 is reset to zero. When the off period between pulses of the received-light signal exceeds the set value of the comparator circuit 510, the count of the counter 509 exceeds the set value of the comparator circuit 510. As a result, the output of the comparator circuit 510 is reversed, so that the RS flip-flop 507 is set, thus operating the gate circuit 503.

The output of the gate circuit 503 is also connected to the set terminal 511-S of the RS flip-flop 511. Therefore, in response to the received-light pulse first arriving after operation of the gate circuit 503, the RS flip-flop 511 is set and the output of the flip-flop 511 operates the gate circuit 515. Under this condition, the rotational speed signal 517 for driving the motor is applied to the counter 512 through the switch 518 and the gate circuit 515, so that the counter 512 counts the rise or fall edges of the motor driving rotational speed signal 517. The count of the counter 512 is compared with the set value of the comparator circuit 513 in the next stage. When the count of the counter 512 exceeds the set value of the comparator circuit 513, the output of the comparator circuit 513 is reversed. This signal is applied to the reset terminal 512-R thus resetting the count of the counter 512 to zero. The output of the comparator circuit 513 is further reversed to the original state. In this way, the comparator circuit 513 produces a pulse when the count of the counter 512 exceeds the set value of the comparator circuit 513. The output pulse of the comparator circuit 513 is applied as a latch timing signal to the latch circuit 505 through the OR gate 514 firstly, as a reset signal to the counters 504 and 512 and the counter 509 through OR gate 508 secondly, and as a reset signal to the RS flip-flops 507 and 511 thirdly. The latch circuit 505 holes the count of the counter 504 and produces it at the output terminals n1 and n2 of the circuit 505. The counts of the counters 504, 509 and 512 are reset to zero, the RS flip-flops 507 and 511 are reset, and the outputs thereof cut off by the gate circuits 503 and 515.

The output of the counter 509 is also connected to the comparator circuit 516, the output of which is connected through the OR gates 514 and 508 to the reset terminal 509-R of the counter 509. Therefore, when the count of the counter 509 exceeds the set value of the comparator circuit 516, the comparator 516 produces an output pulse. This pulse functions in a manner similar to the output pulse of the comparator circuit 513.

As shown in FIG. 5(A), the on time width of the pulses of light receiving pulse signal is designated $t_a$, the off time width of the pulses of each pulse group is designated $t_b$, to the set value of the comparator 510 is designated $T_\alpha$, the time between the pulse groups is designated $t_o$, and the time conversion of the set value $T_\alpha$ is designated $t_\alpha$. Then, if $$3t_a+2t_b+t_a<t_o \qquad (1)$$

$$t_b<t_\alpha \qquad (2)$$

the count of the counter 509 is reset as shown in FIG. 5(B) by the received-light pulse shown in FIG. 5(A) and the output pulse of the OR gate 514 shown in FIG. 5(I) (which is a logic sum of the output pulse of the comparator circuit 516 shown in FIG. 5(D) and the output pulse of the comparator circuit 513 shown in FIG. 5(H)).

In other words, the count of the counter 509 exceeds the set value $T_\alpha$ of the comparator 510 a period of time $t_\alpha$ after the chronologically last pulse of the received-light pulse train, so that the output as shown in FIG. 5(C) is produced from the comparator circuit 510. The RS flip-flop 507 is set at the rise edge of the output signal of the comparator circuit 510 and reset by the pulse signal produced from the OR gate 514 shown in FIG. 5(I). Thus the output of the RS flip-flop 507 takes the form as shown in FIG. 5(E). Under this condition, the gate circuit 503 conducts if the RS flip-flop 507 is set, and is cut off if the RS flip-flop 507 is reset. The RS flip-flop 511, which is set by the received-light pulse after conduction of the gate 503 and reset by the pulse signal produced from the OR gate 514 shown in FIG. 5(I), produces a signal as shown in FIG. 5(F). The gate circuit 515 conducts if the RS flip-flop 511 is set, and is cut off if the RS flip-flop 511 is reset. The output pulse signal of the OR gate 514 is a logic sum of the output pulse signal of the comparator 516 and the output pulse signal of the comparator circuit 513. The comparator circuit 516 produces a pulse when the count of the counter 509 exceeds $T_\beta$ if $$t_\beta>t_o \qquad (3)$$

where the set value of the comparator circuit 516 is $T_\beta$ and the time conversion thereof is $t_\beta$. On the other hand, the comparator circuit 513 produces a signal shown in FIG. 5(H) when the count of the counter 512 exceeds $T_p$ if $$3t_a+2t_b<t_p<t_o \qquad (4)$$

where the set value of the comparator circuit 513 is $T_p$ and the time conversion thereof is $t_p$. The count of the counter 504 takes the form as shown in FIG. 5(J), and the count is transferred to and held by the latch circuit 505. The output signal of this latch circuit (the number of the counts of the received-light pulses) takes the form as shown in FIG. 5(K).

The operation of detecting the record size is started at point A of FIG. 5, and there is no record placed on the turn table so that three received-light pulses are counted before point C. Between points C and D, a 30-cm record is placed on the turn table with the count of the received light pulses being zero.

The operation for one or two received light pulses is the same as that from point A to point C in the drawing.

As explained above, according to the present invention, a received-light pulse associated with the forward end of a received-light pulse train is detected and used as a trigger pulse for starting the counting of the received-light pulses. At the same time, a counting period is set, which is a length of time $t_p$ shorter than the period $t_o$ of the light receiving pulse train. In this way, an erroneous counting of the foremost received-light pulse of the next received-light pulse train which otherwise might occur due to an irregular rotation of the turn table or a mounting error of the light receiving holes is prevented thus preventing the erroneous determination of the record size. Further, in the case of a 30-cm record where received-light pulses are lacking, it is confirmed that there are no received-light pulses for the period of $t_\beta$ longer than the time length $t_o$, thus preventing misjudgement of the record size which otherwise might be caused by the irregular rotation or a mounting error.

We claim:

1. An apparatus for automatically detecting one of a plurality of predetermined possible sizes of a disc record, comprising record size detecting means for generating a pulse signal in the form of groups of pulses in which each group has pulses corresponding in number to one of said possible record sizes, first comparator means for producing a control signal when the interpulse time of the pulse signal produced by said record size detecting means exceeds a first set time corresponding to the normal interpulse period between pulses in a pulse group, time measuring means responsive to the output control signal of said first comparator means and said pulse signal for generating an output representing a measuring time period, second comparator means for comparing the measuring time period represented by the output of said time measuring means with a second set time corresponding to the maximum length of a pulse group, counter means for counting said pulses in said pulse signal, said counter being reset by the output of said second comparator means, gate means responsive to the output of said time measuring means for applying said pulse signal to said counter means, and memory means for storing the output signal of said counter means as an indication of said record size.

2. An apparatus for automatically detecting one of a plurality of predetermined possible sizes of a disc record according to claim 1, the first comparator means including a reference signal source providing a reference signal; second counter means connected to said reference signal source for counting the cycles of said reference signal and connected to said record size detecting means so as to be reset by each pulse in said pulse signal; a comparator for comparing the count of said second counter means with a valve representing the normal interpulse period between pulses in a pulse group and for producing an output when said count exceeds said value; and switch means for generating said control signal in response to the output of said comparator.

3. An apparatus for automatically detecting one of a plurality of predetermined possible sizes of a disc record according to claim 2, wherein said switch means comprises a flip-flop which is set by said control signal and reset by the output of said second comparator means.

4. An apparatus for automatically detecting one of a plurality of predetermined possible sizes of a disc record according to claim 2, wherein said second comparator means comprises additional switch means responsive to a pulse at the output of said gate means for producing an additional control signal, additional gate means responsive to said additional control signal for passing said reference signal from said reference signal source, third counter means connected to the output of said additional gate means for counting the cycles of said reference signal, an additional comparator for comparing the count of said third counter means with a further value representing the maximum length of a pulse group and for producing a reset output when said count exceeds said further value.

5. An apparatus for automatically detecting one of a plurality of predetermined possible sizes of a disc record according to claims 2 or 4, further including third comparator means responsive to the output of said second counter means for comparing the count of said second counter means with a third value representing the maximum period between pulse groups and for producing a reset output to said first-mentioned and second counter means when said count exceeds said third value.

6. An apparatus for automatically detecting record sizes, comprising a turntable on which the records of different diameter sizes are to be placed, said turntable having a plurality of light receiving holes passing therethrough from the upper surface to the back surface thereof, each of the holes being located at a different distance from the center of the turntable in accordance with the possible different diameter sizes of the record and the holes being located at positions angularly shifted from each other by a predetermined amount; a light detector; meansing including a plurality of light receiving elements for sequentially transmitting light from each corresponding hole to said light detector as the turntable rotates to cause said light detector to generate a pulse signal formed of spaced pulse groups each having a number of pulses corresponding to the number of holes not covered by the record placed on the turntable; counter means for counting the number of pulses in a pulse group of the signal outputted from said light detector; interpulse detecting means responsive to the output pulse signal from said light detecting means for detecting the interpulse period within the output pulse train thereof and for generating a control signal when a period is detected which exceeds a normal interpulse period within a pulse group; a gate circuit connected between said light detector and said counter means for passing the output pulse of said light detector to said counter means in response to the control signal from the interpulse detecting means; first time setting means connected to the output of the gate circuit for outputting a first reset signal a first predetermined time after detection of an output pulse of said light detector; second time setting means for outputting a second reset signal a predetermined second time longer than said first predetermined time after generation of said control signal by said interpulse detecting means; supply means for supplying the first and second reset signals to said interpulse detecting means and said counter means respectively; and memory means for storing the output signal from said counter means as a signal representing the diameter size of a record on the turntable.

7. An apparatus for automatically detecting record sizes according to claim 6, the interpulse detecting means comprising a reference signal source producing a reference signal, second counter means for counting the cycles of said reference signal, said second counter means being connected to said light detector so that the counting operation thereof is reset by each output pulse from said light detector; comparing circuit means for outputting a set signal when the count number of said second counter means exceeds a first threshold value of the comparing circuit corresponding to said normal interpulse period; and a first flip-flop circuit connected to receive the set signal of the comparing circuit for outputting the control signal to said gate circuit.

8. An apparatus for automatically detecting record sizes according to claim 7, the first time setting means comprising a second flip-flop circuit connected to receive the output pulse of said light detector applied through the gate circuit to provide a set state for the second flip-flop circuit for outputting a second control signal; a second gate circuit connected to said reference signal source for passing said reference signal in response to said second control signal; third counter means for counting the number of cycles of the output signal of the second gate circuit; and second comparing circuit means for outputting a reset signal when the counter number of the third counter means exceeds a threshold of the second comparing circuit means corresponding to the maximum length of a pulse group.

* * * * *